United States Patent [19]

Monte et al.

[11] 4,328,122

[45] May 4, 1982

[54] COMPONENTS OF CATALYSTS FOR THE POLYMERIZATION OF OLEFINS

[75] Inventors: Antonio Monte; Giuliano Cecchin, both of Ferrara, Italy

[73] Assignee: Montedison S.p.A., Milan, Italy

[21] Appl. No.: 206,541

[22] Filed: Nov. 13, 1980

[30] Foreign Application Priority Data

Nov. 14, 1979 [IT] Italy .................. 27261 A/79

[51] Int. Cl.$^3$ .............................. C08F 4/64
[52] U.S. Cl. .................. 252/429 B; 526/125
[58] Field of Search ................... 252/429 B

[56] References Cited

U.S. PATENT DOCUMENTS

| | | | |
|---|---|---|---|
| 3,094,568 | 6/1963 | Hay et al. | 252/429 B X |
| 4,157,435 | 6/1979 | Toyota et al. | 252/429 B X |
| 4,187,385 | 2/1980 | Iwao et al. | 252/429 B X |
| 4,226,741 | 10/1980 | Luciani et al. | 252/429 B |
| 4,242,480 | 12/1980 | Welch | 252/429 B X |
| 4,250,287 | 2/1981 | Matlack | 252/429 B X |

FOREIGN PATENT DOCUMENTS 848527 5/1977 Belgium .

Primary Examiner—Patrick Garvin

[57] ABSTRACT

Components of catalysts for polymerizing olefins are obtained by grinding together an anhydrous magnesium halide, an ester of an aromatic carboxylic acid and a silicon compound having alkenyl groups and alkoxy groups bound to the silicon atom, of the type of vinyl-triethoxy-silane, and by successively reacting the ground product with a halogenated titanium compound, liquid under the reaction conditions, such as $TiCl_4$.

The present invention provides not only the aforesaid catalyst components for the polymerization of olefins, but also catalysts obtained therefrom and the use of the same, particularly in the polymerization of the alpha-olefins $CH_2=CHR$ wherein R is an alkyl or aryl radical with from 1 to 8 carbon atoms.

In the case of the polymerization of alpha-olefins, the catalytic components, when mixed with organometallic aluminum compounds, yield final catalysts which result in an increase in the polymer yield without lowering the isotacticity index of the polymer.

21 Claims, No Drawings

COMPONENTS OF CATALYSTS FOR THE POLYMERIZATION OF OLEFINS

BACKGROUND OF THE INVENTION

There are known catalyst components for the polymerization of olefins which are usable in the stereoregular polymerization of alpha-olefins and which consist of the product of the reaction of a halogenated Ti compound and of an electron-donor compound with an anhydrous Mg halide.

Said catalytic components are more particularly obtained by processes in which the anhydrous Mg halide is ground in the presence of the electron-donor compound and, optionally, in the presence of the Ti compound, and the ground product is subsequently made to react with a halogenated Ti compound, liquid under the reaction conditions, Examples of such catalytic components are described in Belgian Pat. No. 848,527.

THE PRESENT INVENTION

An object of this invention is to provide improved catalyst components for the polymerization of olefins, in particular of the alpha-olefins $CH_2=CHR$ as defined hereinabove, and which make it possible to increase the polymer yield without decreasing the isotacticity index of the polymer.

This and other objects are achieved by this invention in accordance with which it has been found, unexpectedly, that it is possible to improve the performance of the catalysts obtained from catalytic components prepared by grinding an anhydrous Mg halide together with at least one electron-donor compound selected from the alkyl, aryl and cycloalkyl esters of aromatic acids and by successively reacting the ground product with a halogenated Ti compound, liquid under the reaction conditions, by carrying out the grinding operation in the presence of, besides the ester, also of a silicon compound comprised in the formula:

$$R_mSi(OR')_n$$

wherein:
R is an alkenyl radical with 2–12 carbon atoms;
R' is an alkyl, cycloalkyl or aryl radical with 1–18 carbon atoms;
m is a number ranging from 1 to 2; and
n is equal to 4-m.

In particular, in the case of the stereoregular polymerization of the alpha-olefins, we have found that it is possible to considerably increase the polymer yield without in practice reducing the isotacticity index of the polymer itself, or alternatively, the yield remaining the same, it is possible to obtain higher isotacticity indexes.

Typical silicon compounds useful in practicing the invention are vinyl-trimethoxy-silane and vinyl-triethoxy-silane.

The esters of aromatic acids used in the preparation of the catalyst components are selected from the alkyl esters of benzoic acid and of its derivatives. Typical compounds are the methyl ester of p-methoxybenzoic acid, methyl benzoate or ethyl benzoate, the methyl, ethyl, propyl and butyl toluates and ethyl naphthoate.

The molar ratio ester/silicon compound may vary within a wide range and, in general, is comprised between 1:1 and 10:1. The total quantity of ester and silicon compound, referred to the Mg halide, is such that the molar ratio between ester and Mg halide is comprised between 1:1 and 0.05:1.

The Mg halide is used as such or, either in whole or in part, in the form of a solid compound which, by reaction with the halogenated Ti compound, will generate Mg halide. Examples of such compounds are the Mg alcoholates and halogen-alcoholates, the Mg carboxylates and the adducts between Mg halides and alcohols or silanols.

The water content of the Mg halide is preferably less than 1% by weight.

The grinding is conducted under conditions of duration and efficiency of the employed mills such that the line of greatest intensity of the X-rays powder spectrum of the starting Mg halide decreases in intensity and is broadened to form a halo or said line is replaced by a halo having the maximum of intensity shifted in respect of the interplanar distance of the line.

The usable Ti compounds include the Ti tetrahalides and the halogen-alcoholates of tetravalent Ti. Particularly suited is $TiCl_4$.

With regard to the conditions of reaction of these compounds with the ground product, reference is made to Belgian Pat. No. 848,527.

The Ti compound may also be present during the grinding in amounts corresponding to atomic ratios Mg/Ti lower than 1:1. The reaction with the Ti compound may also be carried out in the presence of the aromatic carboxylic acid ester.

The catalytic components according to this invention form, with Al-alkyl compounds (Al-trialkyls or Al-alkyl halides), catalysts highly active in the polymerization of olefins.

In the case of the stereoregular polymerization of alpha-olefins it is preferred to use Al-alkyl compounds (Al-trialkyls or their mixtures with Al-dialkyl halides) partially complexed with electron-donor compounds.

For the conditions of use and of preparation of said partially complexed Al-alkyl compounds, reference is made in particular to Belgian Pat. No. 848,527.

The catalysts are used according to known methods in polymerization processes carried out in the liquid phase, in the presence or absence of an inert hydrocarbon solvent, or in a gas phase.

The following examples are given for purely illustrative and not limiting purposes and to define the invention in more detail.

PREPARATION OF A CATALYTIC COMPONENT ACCORDING TO THE INVENTION

(a) Grinding 86.8 g of anhydrous $MgCl_2$ (water content of less than 1%), 19.3 g of ethyl benzoate (EB) and 13.9 g of vinyl-triethoxy-silane (VTS) [corresponding to the molar ratios EB/VTS=1.75 and $MgCl_2$/(EB+VTS)=4.5] were coground in a vibratory mill of the VIBRATOM type, built by Siebtechnik, having a total volume of 1000 cc and containing 3.485 kg of inox steel spheroids of 15.8 mm diameter.

The grinding was carried out adopting a filling coefficient equal to 120 g per liter of the total volume, at a temperature inside the mill of about 70° C., and for a grinding time of 60 hours.

The loading of the mill with the products to be ground, the successive grinding and the discharge of the ground product from the mill are carried out in an atmosphere of dry nitrogen.

(b) Treatment with TiCl$_4$ 25 g of the co-ground product of (a) were transferred, still under nitrogen atmosphere, into a 500 cc reactor, in which they were brought into contact with 210 cc of TiCl$_4$.

The treatment with TiCl$_4$ was carried out at 80° C. for 2 hours, under stirring at 100 rpm, after which the excess TiCl$_4$ and the products dissolved in it were removed at 80° C. by syphoning. This operation was followed by 5 washings with hexane at 65° C., using 200 cc for each washing.

The catalytic solid thus obtained was suspended in a quantity of hexane such as to have a concentration of 100 g/l.

The table that follows reports the results obtained in the polymerization of propylene with the use of the catalytic component described above.

Examples 1 and 2 are according to the invention and Example 3 is a comparative example (use of a catalytic component free from silicon compound).

The polymerization was carried out as follows:

5.05 millimols of a mixture (MAB) of Al-butyls (54.5% mols of Al-i-Bu$_3$ and 45.5% mols of Al-n-Bu$_3$) were made to react, at room temperature for 5 minutes, with ethyl p-toluate (EPT) dissolved in 80 cc of anhydrous n-heptane in amounts corresponding to the MAB-EPT molar ratios indicated in the Table.

30 cc of the foregoing solution, diluted with 50 cc of anhydrous n-hexane, were put into contact for 5 minutes with a quantity of the catalytic component, prepared as indicated above, equivalent to 1.3 mg of Ti. This suspension was introduced, under a pure nitrogen atmosphere, into a 2.5 liter inox steel autoclave fitted with a magnetic propeller stirrer and thermo-couple, containing 870 cc of n-hexane saturated with propylene at 40° C.

Thereupon here were introduced the remaining 50 cc of the solution of MAB and EPT, in a flow of propylene.

After sealing of the autoclave, there were introduced 300 Ncc of hydrogen, the temperature was raised to 60° C. and, simultaneously, there was introduced propylene up to attaining a total pressure of 7 atm. During the polymerization the pressure was maintained constant by the continuous feeding in of propylene.

After 4 hours the polymerization was interrupted by fast cooling down and degassing of the polymeric slurry.

The polymer was separated from the solvent by steam stripping and dried in a current of nitrogen at 70° C.

TABLE

| | Polymerization of Propylene | | | | |
|---|---|---|---|---|---|
| Example No. | Molar ratio MAB/ EPT | Yield g polymer/ g Ti | Mg and Cl residues in the polymer ppm | | Iso-tacticity Index | Intrinsic Viscosity dl/g |
| | | | Mg | Cl | | |
| 1 | 3 | 316,000 | 27 | 78 | 94.0 | 2.3 |
| 2 | 5 | 400,000 | 21 | 60 | 91.0 | — |
| 3 (comparison) | 3 | 370,000 | 36 | 105 | 90.5 | 2.2 |

What we claim is:

1. Components of catalysts for the polymerization of olefins, obtained by cogrinding an anhydrous magnesium halide with an ester of an aromatic carboxylic acid and with a silicon compound of the formula R$_m$Si(OR')$_n$ in which R is an alkenyl radical with from 2 to 12 carbon atoms; R' is an alkyl, a cycloalkyl or an aryl radical with from 1 to 18 carbon atoms; m is a number ranging from 1 to 2, and n is equal to 4-m; and subsequently reacting the ground product with a halogenated titanium compound liquid under the reaction conditions.

2. Components of catalysts according to claim 1, in which the magnesium halide is MgCl$_2$.

3. Components of catalysts according to claim 1, in which the aromatic carboxylic acid ester is an alkyl ester of benzoic acid or of a derivative of said acid.

4. Catalyst components according to claim 1, in which the silicon compound is vinyl-trimethoxy-silane.

5. Catalyst components according to claim 1, in which the titanium compound is a Ti tetrahalide.

6. Catalyst components according to claim 1, in which the aromatic carboxylic acid ester is ethyl benzoate.

7. Catalyst components according to claim 1, in which the silicon compound is vinyl-triethoxy-silane.

8. Catalyst components according to claim 1, in which the titanium compound is TiCl$_4$.

9. Catalyst components according to claim 1, in which the magnesium halide is MgCl$_2$, the aromatic carboxylic acid ester is ethyl benzoate, the silicon compound is vinyl-triethoxy-silane, and the titanium compound is TiCl$_4$.

10. Catalysts for the polymerization of olefins and prepared by mixing
    (a) the product obtained by cogrinding an anhydrous magnesium halide with an ester of an aromatic carboxylic acid and with a silicon compound of the formula $$R_mSi(OR')_n$$

in which R is an alkenyl radical with from 2 to 12 carbon atoms; R' is an alkyl, a cycloalkyl or an aryl radical with from 1 to 18 carbon atoms; m is a number ranging from 1 to 2; and n is equal to 4-m; and subsequently reacting the ground product with a halogenated titanium compound liquid under the reaction conditions;
with
    (b) an aluminum trialkyl or an aluminum alkyl halide.

11. Components of catalysts according to claim 1, in which the magnesium halide is MgCl$_2$, the aromatic carboxylic acid ester is ethyl benzoate, the silicon compound is vinyl-trimethoxy-silane, and the titanium compound is TiCl$_4$.

12. Catalysts according to claim 10, in which the anhydrous magnesium halide is MgCl$_2$.

13. Catalysts according to claim 10, in which the aromatic carboxylic acid ester is an alkyl ester of benzoic acid or of a derivative of said acid.

14. Catalysts according to claim 10, in which the silicon compound is vinyl-trimethoxy-silane.

15. Catalysts according to claim 10, in which the titanium compound is a Ti tetrahalide.

16. Catalysts according to claim 10, in which the aromatic carboxylic acid ester is ethyl benzoate.

17. Catalysts according to claim 10, in which the silicon compound is vinyl-triethoxy-silane.

18. Catalysts according to claim 10, in which the titanium compound is $TiCl_4$.

19. Catalysts according to claim 10, in which the magnesium halide is $MgCl_2$, the aromatic carboxylic acid ester is ethyl benzoate, the silicon compound is vinyl-triethoxy-silane or vinyl-trimethoxy-silane, and the titanium compound is $TiCl_4$.

20. Catalysts according to claim 10, in which (b) is an aluminum butyl.

21. Catalysts according to claim 10, in which the magnesium halide is $MgCl_2$, the aromatic carboxylic acid ester is ethyl benzoate, the silicon compound is vinyl-triethoxy-silane or vinyl-trimethoxy-silane, the titanium compound is $TiCl_4$, and (b) is a mixture of Al-i-$Bu_3$ and Al-n-$Bu_3$.

* * * * *